July 7, 1953 M. SEGRE Re. 23,683
FOUNTAIN PEN
Original Filed May 5, 1947 3 Sheets-Sheet 1
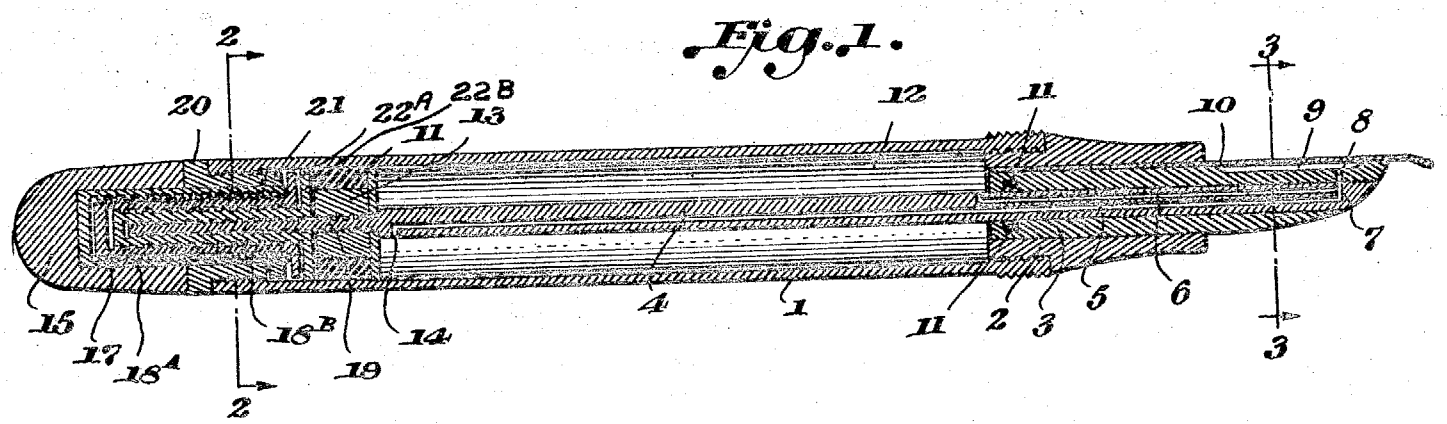
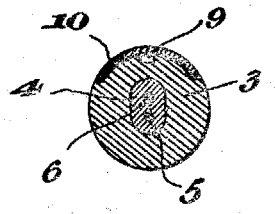
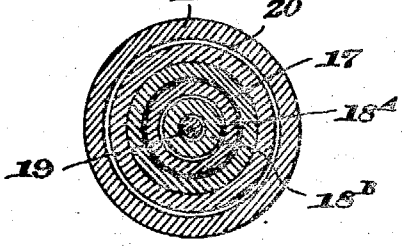
INVENTOR
Maria Segre
BY Wenderoth, Lind + Ponack
ATTORNEYS July 7, 1953 M. SEGRE Re. 23,683
FOUNTAIN PEN
Original Filed May 5, 1947 3 Sheets-Sheet 2
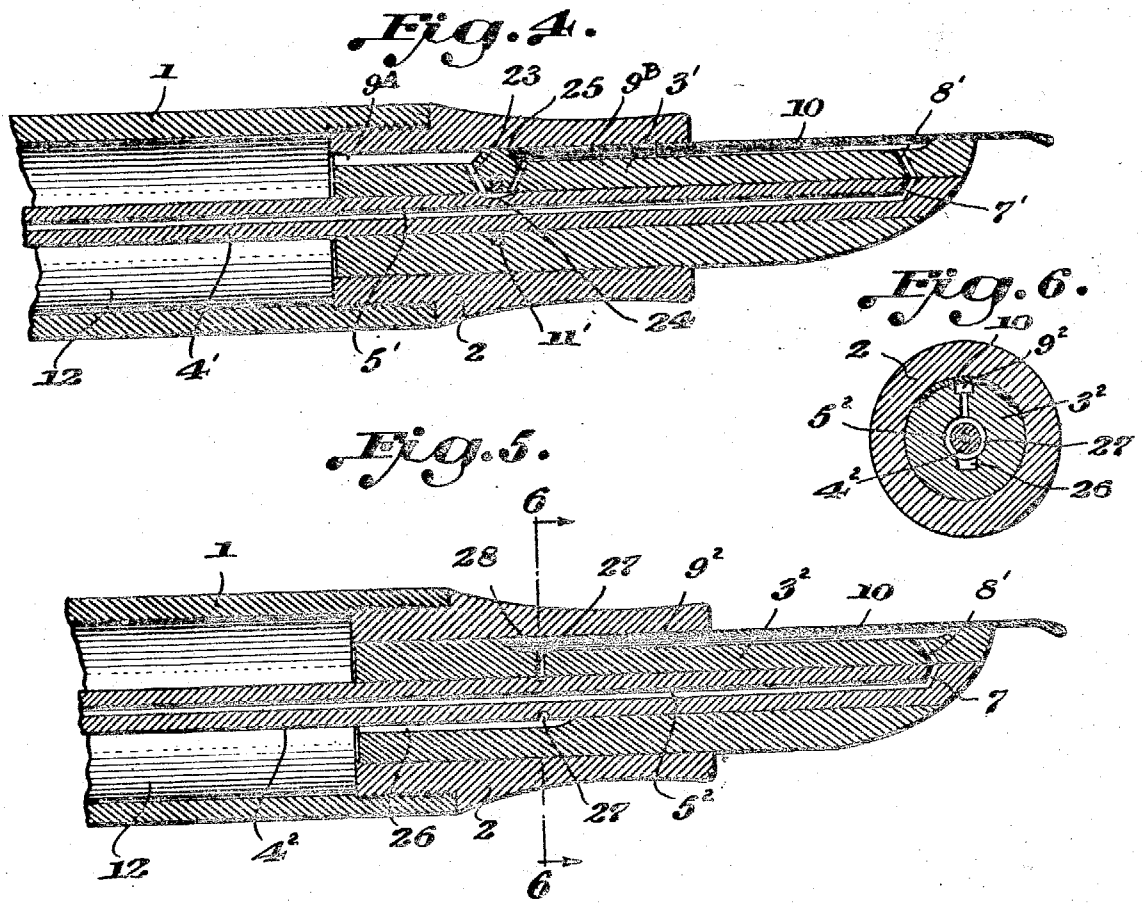
INVENTOR
Mario Segre
BY Wenderoth, Lind & Ponack
ATTORNEYS July 7, 1953 M. SEGRE Re. 23,683
FOUNTAIN PEN
Original Filed May 5, 1947 3 Sheets-Sheet 3
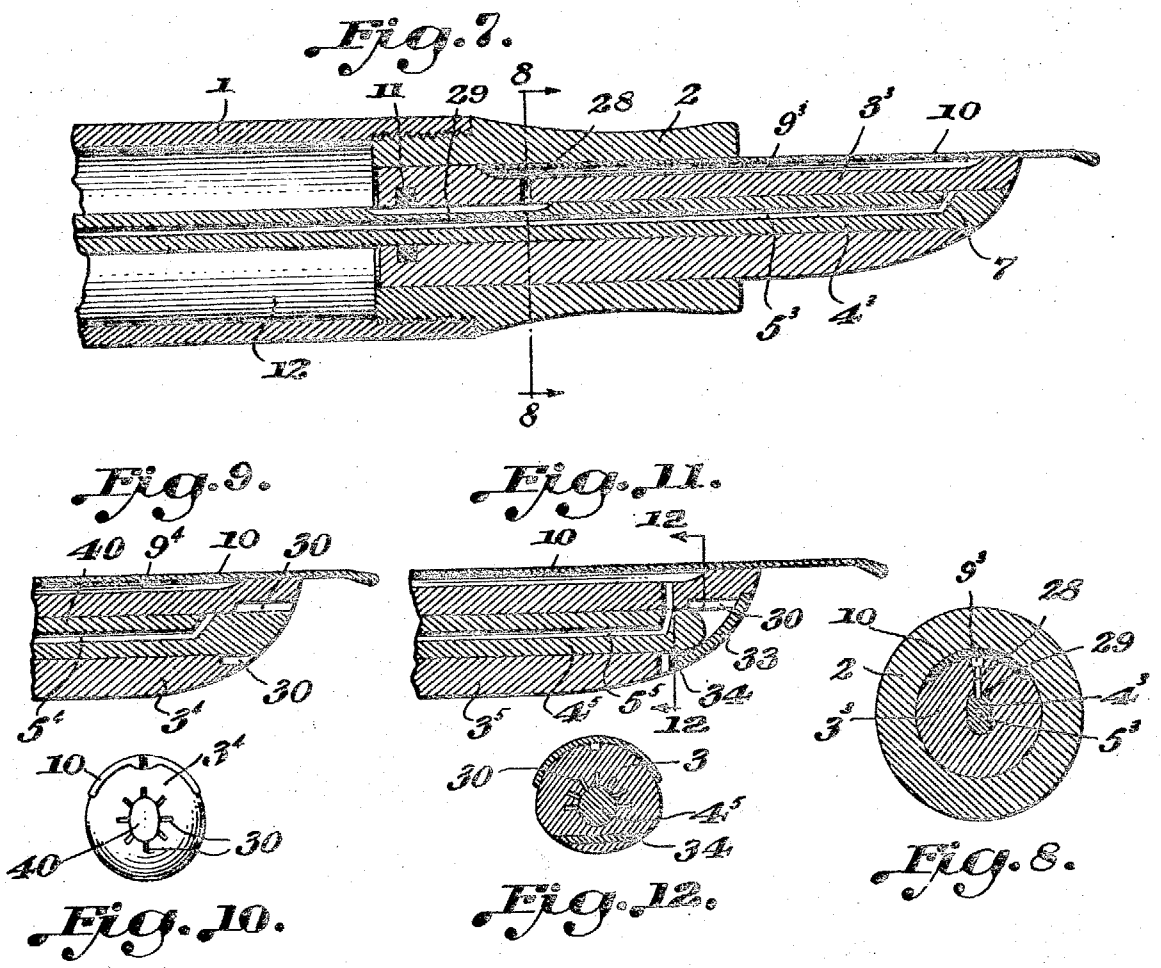
INVENTOR
Mario Segre
BY Wenderoth, Lind & Ponack
ATTORNEYS Reissued July 7, 1953 Re. 23,683

UNITED STATES PATENT OFFICE 23,683

FOUNTAIN PEN

Mario Segre, Quito, Ecuador, assignor to W. A. Sheaffer Pen Company, Fort Madison, Wis., a corporation of Delaware Original No. 2,603,189, dated July 15, 1952, Serial No. 745,997, May 5, 1947. Application for reissue October 31, 1952, Serial No. 318,152

11 Claims. (Cl. 120—47)

Matter enclosed in heavy brackets [ ] appears in the original patent but forms no part of this reissue specification; matter printed in italics indicates the additions made by reissue.

This invention relates to fountain pens in general and more particularly to a fountain pen having a large ink capacity in comparison with known fountain pens of the automatic filling type.

An object of the present invention is to provide a fountain pen wherein the filling is attained by a single easy continuous action and wherein the pen will be completely filled without the necessity of a continuous pumping action of a piston.

A further object of the invention is to provide a fountain pen of the type described wherein the filling of the pen can be effected with no discharge of the ink from the reservoir.

A still further object of the invention is to provide a fountain pen so arranged and constructed that when filling the pen, the pen [proper] *nib* and surrounding [pen] *nib* support and [pen] *nib* holder will remain out of the filling ink supply and consequently will not be in contact with the ink.

Another object of the invention is to provide a pen which is not [effected] *affected* by changes in pressure or temperature and wherein means are provided whereby the pen [proper] *nib* will not be flooded with ink even after immediately filling the pen and wherein the flow of ink from the reservoir to the [pen] *nib* is always the same regardless of the quantity of ink [therein] *in the pen.*

Still another object of the invention is to provide a sturdy and simple construction of a fountain pen susceptible of easy assembly and disassembly and in which all parts are not susceptible of easy damaging.

Other and further objects of the invention will be apparent from the following detailed discussion of preferred embodiments of the invention, taken together with the accompanying drawings in which Figure 1 is a longitudinal sectional view of the fountain pen of the present invention;

Figure 2 is a cross-sectional view taken on the line 2—2 of Figure 1;

Figure 3 is a cross-sectional view taken on the line 3—3 of Figure 1;

Figure 4 is a partial sectional view of a modification of the filling means for the pen;

Figure 5 is a partial sectional view of still another filling means for the pen;

Figure 6 is a cross-sectional view taken on the line 6—6 of Figure 5;

Figure 7 is a partial sectional view of still another filling means for the pen;

Figure 8 is a cross-sectional view taken on the line 8—8 of Figure 7;

Figure 9 is a partial sectional view of a modification embodying ink absorbing and retaining means;

Figure 10 is a front elevational view of the embodiment of Figure 9;

Figure 11 is a partial cross-sectional view of a still further embodiment of the invention disclosing means for preventing foreign material from entering the pen when in use, and Figure 12 is a cross-sectional view taken on the line 12—12 of Figure 11.

[The pen has a tube 1 at the end of which a penholder 2 is attached by screwing or by pressure. In the penholder 2 there is an opening into which a pen 10 together with a pen-support 3 are inserted in such a manner that no ink may pass from the reservoir 12 formed by the tube 1 between the penholder and the pen or, between the penholder and the pen-support. The pen-support 3 has an oblong opening through which passes a filler-needle 4 which in the specification will be referred to as a "needle."] *Referring now more particularly to Figs. 1 to 3, the pen has a tube or barrel 1 at the end of which a cylindrical nib holder and gripping section 2 is attached by screwing or by pressure. In the nib holder there is an axial bore or opening into which a pen nib 10 together with a nib support 3 is inserted in such a manner that no ink may pass from a reservoir 12 formed by the tube 1 between the nib holder and the nib, or between the nib holder and the nib support. The nib support 3 comprises a cylindrical plug which has an oblong axial bore or opening through which passes a filler-needle 4 which will hereinafter be referred to as a needle.* The needle 4 has on its upper end a piston 13 fixed thereto in any desired manner and which fits exactly into tube 1 and serves for filling and emptying reservoir 12. An extension of needle 4 passes through the piston 13 and forms a bolt 18 which has screw threads thereon. This bolt is screwed into a tube 18B which is screw-threaded on the inside and also has screw-threads outside which again are screwed into a tube 18A of similar construction as 18B. Tube 18A is screwed into tube 17 which is internally screw-threaded, thus forming a system of multiplication of screw-threads. Tube 17 passes through piece 20 in which it is fixed by ring 21 which allows rotation thereof but prevents it from being detached. Tube 17 is, on one end, fixed to button *or cap* 15 so as to be easily turned by hand. When the button 15 is turned to the right or to the left, the various threads in combination screw or unscrew and thus, the piston 13 with the needle 4 are moved with respect to the tube 1. To guide tubes 18A and 18B there may be provided respective rings 22a and 22b for each, which are loosely inserted in tube 1.

The number of screw-threads and multiplying pieces may be increased or decreased according to the necessities of construction, size of the fountain-pen and the amount of ink in relation to the size of the fountain-pen itself.

The needle 4 has two *longitudinally extending* tubular channels *or passageways* 5, 6 therein Channel 5 extends substantially completely through the needle, from an opening 7 *in a side wall of the needle* adjacent the lower end *thereof* to opening 14 at the upper end. The other tubular channel *or passageway* 6 starts in the opening 7 but[,] its upper end is situated opposite the lowest point of reservoir 12 when the needle is in retracted position or completely inside, i. e. the piston in its highest position. When the needle 4 is in this position, opening 7 is situated opposite a channel 8 *extending radially through the nib support 3* and leading to space 9 which is situated below *or underneath* the [pen] *nib* 10 and is for supplying ink to the [pen] *nib*. This space also serves as an ink-deposit *or expansion chamber* under the [pen] *nib* 10 and can be so constructed that it may contain a maximum of ink and at the same time have a large retaining capacity by means of cells or, any retaining system but always permitting an adequate supply to the pen *nib*. To avoid leakage of air or ink between needle 4 and [pen-support] *the nib support* 3 a round packing 11 as shown in Figure 1 can be inserted around needle 4.

The needle 4 is preferably oval in shape in this embodiment and the oblong opening through [pen-support] *the nib support* 3 is of a conformingly oval cross section in order to prevent its turning together with the piston 13 fixed to it, as the turning of the needle 4 would prevent functioning of the system of screw-threads and consequently the system of filling the pen. The needle could also have other shapes, for example, flat with round edges.

*It will be noted that the needle 4 is thus reciprocably mounted within the cylindrical plug which forms the nib support 3. The pen nib 10 is mounted adjacent the outer surface of the nib support and is radially spaced from the needle 4. In this embodiment the radially extending channel or passageway 8 in the nib support provides communication between the reservoir 12 and the expansion chamber 9 and nib 10 when the needle is in the retracted position as shown in Fig. 1 but this communication is interrupted when the forward end of the needle having the opening 7 is moved to the extended position for purposes of filling as hereinafter described.*

The described fountain pen operates as follows: to fill it, button *or cap* 15 which is joined to tube 17 is rotated to move the piston 13 until ink commences to flow out of the end of needle 4. When the ink thus begins to flow out, the end of needle 4 together with opening 7 is *normally extended or projected forwardly of the writing point of the nib 10 and it is then* immersed into the ink [and]. *The* button 15 is then rotated in the opposite direction so as to retract piston 13 into the reservoir 12 together with the needle, which should during this time *have its forward end* remain *immersed* in the ink. A vacuum is thereby created within reservoir 12 and the ink will therefore pass through opening 7, tubular channel 5 and through opening 14 into the reservoir. When the piston 13 and needle 4 reach the fully retracted position, the fountain-pen is completely filled and communication is then established between reservoir 12 through channel 6, opening 7, channel 8 up to the space 9 which supplies pen *nib* 10 as in other type fountain-pens. The communication through channel 6 to the [pen] *nib* is established only when the piston 13 and needle 4 are in their fully retracted position and the filling operation is finished. Tubular channel 6 is solely for providing ink to space 9 which forms supply and deposit means for ink behind the pen *nib*.

When filling the reservoir 12 is completed, the needle is empty because the last part of the piston movement is done without [thte] *the* needle 4 being immersed in the ink. Immediately, a circulation is established between reservoir 12 and spaces 6, 7, 8, 9. Therefore the ink flows from reservoir 12 to spaces 6, 7, 8, 9. Meanwhile air will escape through spaces 8, 7, 5, 14. When ink has filled space 9 (i. e. the pen is ready for writing), the flow of ink to the pen *nib* is interrupted. Subsequently the flow of ink continues normally by gravity and cohesion of the liquid.

*It will thus be apparent that means have been provided whereby the reservoir of a fountain pen may be readily filled with ink without the necessity of dipping the nib or writing point of the instrument directly into the ink during the filling operation and therefore it is not necessary to wipe or blot excess ink from the nib after the filling step has been completed. Also, after filling, the needle is automatically retracted to a position rearwardly of the writing point so as not to interfere when the instrument is used for writing. The filling needle is conveniently reciprocated by turning the button or cap 15 which is mounted for rotation on the rearward end of the barrel 1, the needle being held against axial rotation whereby the threaded means cooperating between the needle and the button effects said reciprocation upon relative rotation of the elements. The provision of the opening 7 in a side wall of the needle and the axial passageway 8 in the nib support permits the flow of ink from the reservoir to the nib automatically only after the needle has been retracted to its rearward position and without further manipulation of the instrument. In the embodiment shown in Figs. 1 to 3 the venting passageway 5 and the ink feeding passageway 6 both extend through the needle and communicate with the nib through the registering passageways 7 and 8, thereby eliminating the necessity for separate valve arrangements for the ink feeding passageways and the venting passageways while the instrument is being used for writing.*

In Figure 4 a modification of the construction is shown as regards the supply of ink to the pen *nib*. Needle 4 has, in this construction, only the tubular channel [5] 5' which serves for filling the pen. The supply to the pen *nib* is effected through a channel 9a in support 3', and from there by way of channel 23 through channel 24 in needle 4' and channel 25 to space 9b situated beneath the [pen] *nib* 10 which is consequently supplied by it. When moving the needle for filling or emptying the fountain-pen, channel 24 changes its position thereby interrupting communication between channel 23 and channel 25 and cuts off the path of the ink to the [pen] *nib*. At the same time, this path of communication between the reservoir and the outside is cut off. Thus, communication between reservoir 12 and the exterior for filling and emptying the pen is established through channel 5′ in the needle. It is possible in this modification to retain a channel 8′ to insure the balance of ink inside the pen. Nevertheless, channel 8′ is not an indispensable part of the supply system for the [pen] *nib*. A packing 11′ can be used to prevent ink from passing from channel 23 to channel 25 when the pen is being filled or emptied.

In Figures 5 and 6 another embodiment of the supply system for the [pen] *nib* is shown. Here the ink flows from reservoir 12 through a channel 26 and an annular channel 27 around the needle $4^2$ through a channel 28, to channel $9^2$ which supplies the [pen] *nib*. By moving the needle with the annular channel 27, communication between channel 26 and channel 28 and thus, supply to the [pen] *nib* is interrupted.

In Figures 7 and 8 a different supplying system for the pen *nib* is shown. The ink flows from reservoir 12 through a channel 29 formed in the needle $4^3$ and through channel 28 to channel $9^3$ which supplies the [pen] *nib*. By moving the needle $4^3$ with channel 29, communication between the latter and reservoir 12 is interrupted.

Figures 9 and 10 show means to absorb ink remaining on the exterior surface of the needle 40 when it is drawn out of the ink after having filled the pen. In the lower end of [pen-support] *nib support* $3^4$ there are situated radially, around the opening of needle 40, channels which together form space 30. This space should possess sufficient capacity to absorb all ink adhering to the outer surface of the needle 40 and the channels comprising it should be so constructed as to possess a capillary action of adhesion.

Figures 11 and 12 show means for closing space 30 when the needle $4^5$ is inside of the pen, to prevent spaces 30 and $5^5$ from getting dirty while the pen is being used. It consists in a disc 33, pivotally connected at 34 which opens and closes together with the needle $4^5$ as the needle is extended or retracted.

It is obvious that changes in construction and modifications of details can be effected without departing from the scope of the present invention as defined in the appended claims.

I claim:

1. In a fountain pen, in combination a barrel, a [pen] *nib* support in an end of said barrel, a [point] *nib* on said [pen] *nib* support, said [pen] *nib* support having a longitudinal bore therethrough, a filler-needle movably mounted in said barrel, an end of said filler-needle entering said bore in said [pen] *nib* support and being slidable therein, a piston fixed to said filler-needle in said barrel at an end remote from said [pen] *nib* support, said filler-needle having a channel therethrough and an opening from said channel in communication with said barrel adjacent one end thereof and another opening from said channel through the side of said filler-needle at the opposite end thereof, said [pen] *nib* support having an inwardly directed opening therein for coaction with said other opening in said filler-needle, means secured to said filler-needle for moving said piston and said filler-needle with respect to said barrel whereby the said other opening in said filler-needle is projected from said [pen] *nib* support for filling and emptying of said pen, and ink feeding means for said [pen point] *nib* in communication with said opening in said [pen] *nib* support, said ink feeding means being operable only when said filler-needle and said piston are in fully retracted position when said longitudinal bore is in open communication with said opening in said [pen] *nib* support.

2. In a fountain pen as claimed in claim 1, said means for moving said filler-needle and said piston comprising a plurality of tubes having screw threaded surfaces thereon, said tubes being mounted one over the other and the screw threaded portions thereof of one said tube coacting with the screw threaded portion of an adjacent tube, the innermost of said tubes being in screw threaded contact with said filler-needle whereby upon rotation of the outermost of said tubes said piston and said filler-needle will be urged forwardly through said coacting tubes.

3. In a fountain pen as claimed in claim 1, said filler-needle having a second channel therein opening at one end into said barrel and at the other end thereof communicating with the said ink deposit for said [pen point] *nib* through said opening in said [pen] *nib* support, the first said opening of said second channel being closed upon forward movement of said filler-needle and the second said opening of said second channel being out of communication with said ink deposit upon forward motion of said filler-needle, said openings of said second channel being operable when said filler-needle and said piston are in fully retracted position to provide ink flow from said barrel to said [pen point] *nib*.

4. In a fountain pen as claimed in claim 1, said ink feeding means for said [pen point] *nib* comprising a channel in said [pen] *nib* support having two branches therein directed towards and in communication with the external surface of said filler-needle, said filler-needle having a recess therein normally in communication with both said branches when said filler-needle is in fully retracted position, the surface of said filler-needle cutting off communication between said branches when said filler-needle is moved forwardly for filling or emptying said pen.

5. In a fountain pen as claimed in claim 1, said ink feeding means for said [pen point] *nib* comprising a longitudinal channel in said [pen] *nib* support in open communication with ink in said barrel, an annular channel around the periphery of said filler-needle, said [pen] *nib* support having a second channel therein communicating at an end thereof with an ink deposit for said [pen point] *nib* and communicating with said annular channel when said filler-needle is in fully retracted position, said annular channel being out of communication with said second channel in said [pen] *nib* support when said filler-needle is moved forwardly.

6. In a fountain pen as claimed in claim 1, said ink feeding means comprising a longitudinal channel formed in the external surface of said filler-needle, a channel in said [pen] *nib* support communicating at one end thereof with an ink deposit for said [pen point] *nib* and at the other end thereof with said external channel in said filler-needle, an end of said external channel in said filler-needle being in communication with ink in said barrel when said filler-needle is in fully retracted position and being out of communication with ink when said filler-needle is moved forwardly.

7. In a fountain pen as claimed in claim 1, said [pen] *nib* support having a plurality of radially spaced channels in the free end thereof, said radially spaced channels together forming a capillary space for absorbing ink adhering to the outer surface of said filler-needle after said pen has been filled with ink.

8. In a fountain pen as claimed in claim 7, a disc hingedly connected to said [pen] *nib* support, said disc covering said radially spaced channels in said [pen] *nib* support when said filler-needle is in retracted position.

*9. A fountain pen comprising a barrel enclosing an ink reservoir, a plug mounted on a forward end of said barrel having means defining a longitudinal bore therethrough, a pen nib mounted on a forward end of said barrel transversely spaced from said bore, and a filler-needle mounted for reciprocation within said bore, said filler-needle having ink feed and venting channels extending longitudinally therethrough each being in communication with said reservoir at one end and having means defining an opening at the forward end of said filler-needle in communication with said channels, said channels providing the sole means for filling said reservoir and for venting said reservoir and feeding ink from said reservoir to said nib when said pen is in use, said filler-needle having a forward end extensible to a position forwardly of said nib and retractable to a position rearwardly of the forward end of said nib, and said plug including means defining a transverse ink-feeding passageway communicating between said nib and said opening when said filler-needle is retracted to said rearward position.*

*10. A fountain pen comprising a barrel enclosing an ink reservoir and including a pair of coaxial portions secured together in relatively axially rotatable relationship, a pen nib mounted on a forward end of said barrel and transversely spaced from the longitudinal axis thereof, a filler-needle coaxial with said barrel mounted for reciprocation through the forward end thereof for extending the forward end of said filler-needle to a position forwardly of said nib and for retracting said forward end to a position rearwardly of the forward end of said nib, said filler-needle having means defining longitudinal feed and vent channels therethrough communicating with said reservoir and having means defining an opening adjacent the forward end of said filler-needle in communication with said feed channel, said opening being in ink feeding communication with said pen nib when said filler-needle is in said retracted position, said channels providing the sole means for filling and venting said reservoir and for feeding ink from said reservoir to said nib when said pen is in use, restraining means on one of said coaxial portions for holding said filler-needle against axial rotation when the other of said coaxial portions is being rotated relatively thereto, and threaded means secured to said filler-needle and said other coaxial portion cooperating to reciprocate said filler-needle when said portions are relatively rotated.*

*11. A fountain pen comprising a pen nib, a nib support adjacent said nib, said support having means defining a longitudinal bore therethrough spaced from said nib, a fluid reservoir positioned rearwardly of said support, a filler-needle having a forward end mounted in said bore and having a rearward end mounted on said reservoir, the forward end of said filler-needle being extensible through said bore to a position forwardly of said nib and retractable to a position rearwardly of the forward end of said nib, said filler-needle including means defining feed and vent channels extending longitudinally from the forward end thereof into communication with said reservoir and having means defining an opening in a forward end thereof in communication with said feed channel, said nib support including means defining an ink feed passageway communicating between said nib and said opening when said filler-needle is retracted to the rearward position, and said channels providing the sole means for filling and venting said reservoir and for feeding ink from said reservoir to said nib when said pen is in use.*

MARIO SEGRE.

References Cited in the file of this patent or the original patent

UNITED STATES PATENTS

| Number | Name | Date |
|---|---|---|
| 1,509,420 | Edelman | Sept. 23, 1924 |
| 1,548,502 | Attula | Aug. 4, 1925 |
| 1,567,527 | Lynn et al. | Dec. 29, 1925 |
| 1,706,616 | Kovacs | Mar. 26, 1929 |
| 1,719,374 | Ihara | July 2, 1929 |
| 1,903,022 | Bassett | Mar. 28, 1933 |

FOREIGN PATENTS

| Number | Country | Date |
|---|---|---|
| 20,065 | Great Britain | of 1907 |